Patented May 9, 1939

2,157,205

UNITED STATES PATENT OFFICE 2,157,205

PAINT

William T. Hancock, Long Beach, Calif.

No Drawing. Application December 13, 1937,
Serial No. 179,451

5 Claims. (Cl. 134—39)

This invention relates generally to paints and has for its primary object to provide coating materials having exceptional resistance to deterioration and discoloration under high temperatures at which the ordinary paints will scale off and rapidly lose their normal color.

I have found that finely divided elemental molybdenum suspended or dispersed within the vehicle constituent of the paint or coating material, renders the material capable of withstanding, over extended periods, temperatures that will cause oxidation and virtual destruction of the filming properties of ordinary paints, in a short time. Accordingly, one of my principal objects is to provide a heat resistant paint for application to heated metal surfaces, that will maintain an effective oxidation preventing coating and also retain its normal appearance. The accomplishment of this object is of particular importance in making heat resistant white paints in that ordinarily, when applied to surfaces heated for example as high as 600–700° F., they soon lose their fresh white color and become definitely discolored. By incorporating elemental molybdenum in a white paint as later described, I have been able to produce a paint that displays excellent results where applied to heated metallic surfaces, both as to film and color stability.

Generally speaking, the molybdenum may be incorporated in the liquid, resinous or oily vehicle of various paints or surface coating materials, to give the desirable properties mentioned above. The molybdenum to be used may be obtained as the substantially pure metal, or an impure molybdenum, containing for example iron or other foreign metals, may first be treated to remove the impurities, as by leaching with a hydrochloric or other acid wash that will carry the impurities in solution. By pulverizing the polybdenum to a fine state of division, preferably at least to the extent that the particles will pass 150 mesh screen, or finer if desired, the metal can be suspended in a state of uniform distribution throughout the vehicle, and applied uniformly to the surface to be coated. The coating material or paint may carry any suitable proportion of the finely divided molybdenum, depending upon the particular properties desired and the purpose for which the material is to be used. Generally, I prefer to use less than substantially 5%, by weight, of molybdenum, and usually around 2 to 3%.

In preparing a heat resistant white paint, the molybdenum may be mixed with a suitable ordinary white paint comprising a synthetic resinous vehicle and suspended pigment. The following may be given as a typical white paint compostion coming within the scope of the invention: 50–60% synthetic resin vehicle (e. g. of the glycerol, acrylic or urea formaldehyde type); 40–50% pigment (e. g. titanium oxide); and 2–3% molybdenum passing a 160 mesh screen. As indicated above, the molybdenum retards discoloration of the paint when heated, and it has the further effect upon or in combination with the vehicle, and due apparently to the heat resisting and spreading or filming properties of the elemental molybdenum, of reducing the tendency for the vehicle to deteriorate and the pant to scale.

I claim:

1. A paint comprising a vehicle containing a pigment normally subject to permanent discoloration when heated to high temperatures, and finely divided elemental molybdenum suspended in the vehicle in sufficient quantity to inhibit discoloration of the pigment at high temperatures.

2. A paint comprising a vehicle containing a pigment normally subject to permanent discoloration when heated to high temperatures, and finely divided elemental molybdenum suspended in the vehicle, said molybdenum being pulverized to a fineness passing substantially 150 mesh screen and the molybdenum content being less than 5% by weight of the paint.

3. A white paint containing white pigment and of a composition normally subject to permanent discoloration when heated to high temperatures, said paint containing finely divided molybdenum in sufficient quantity to inhibit discoloration of the paint at such temperatures.

4. A white paint comprising a resinous vehicle, a white pigment normally subject to permanent discoloration when heated to high temperatures, and finely divided elemental molybdenum suspended in the paint and acting to inhibit discoloration of the paint at such temperatures.

5. A white paint comprising a resinous vehicle, a white pigment normally subject to permanent discoloration when heated to high temperatures, and finely divided elemental molybdenum suspended in the paint, the molybdenum being less than substantially 5% by weight of the paint and being pulverized to a fineness passing substantially 150 mesh screen.

WILLIAM T. HANCOCK.